US006885784B2

(12) United States Patent
Bohnert

(10) Patent No.: US 6,885,784 B2
(45) Date of Patent: Apr. 26, 2005

(54) ANISOTROPIC DISTRIBUTED FEEDBACK FIBER LASER SENSOR

(75) Inventor: Klaus Bohnert, Oberrohrdorf (CH)

(73) Assignee: Vetco Gray Controls Limited, Nailsea (GB)

( * ) Notice: Subject to any disclaimer, the term of this patent is extended or adjusted under 35 U.S.C. 154(b) by 124 days.

(21) Appl. No.: 10/399,134
(22) PCT Filed: Oct. 2, 2001
(86) PCT No.: PCT/CH01/00591
§ 371 (c)(1),
(2), (4) Date: Apr. 14, 2003
(87) PCT Pub. No.: WO02/33374
PCT Pub. Date: Apr. 25, 2002

(65) Prior Publication Data
US 2004/0093950 A1 May 20, 2004

(30) Foreign Application Priority Data
Oct. 18, 2000 (EP) ............................................ 00810965

(51) Int. Cl.$^7$ ................................................ G02B 6/00
(52) U.S. Cl. ................................ 385/12; 385/37; 372/6
(58) Field of Search ............................. 385/12, 13, 37, 385/38; 372/6, 50, 20, 96, 102

(56) References Cited

U.S. PATENT DOCUMENTS

| | | | |
|---|---|---|---|
| 4,915,468 A | | 4/1990 | Kim et al. |
| 5,448,657 A | | 9/1995 | Kim et al. |
| 5,564,832 A | | 10/1996 | Ball et al. |
| 5,771,251 A | | 6/1998 | Kringlebotn et al. |
| 5,844,927 A | * | 12/1998 | Kringlebotn .............. 385/12 X |

FOREIGN PATENT DOCUMENTS

| | | |
|---|---|---|
| WO | 99/32863 | 7/1999 |
| WO | 99/44023 | 9/1999 |
| WO | 00/39552 | 7/2000 |

OTHER PUBLICATIONS

G. A. Ball et al. "Standing–Wave Monomode Erbium Fiber Laser", IEEE Photonics Technology Letters, vol. 3, No. 7, Jul. 1991.
Shang–Yuan Huang et al., "Perturbation Effects on Mode Propagation in Highly Elliptical Core Two–Mode Fibers", Journal of Lightwave Technology, vol. 8, No. 1, Jan. 1990.
Canning et al., "Phase–Shifted Periodic Distributed Structures in Optical Fibres by UV Post–Processing", Electronics Letters Aug. 4, 1994, vol. 30, No. 16, p. 344.

(Continued)

Primary Examiner—Phan T. H. Palmer
(74) Attorney, Agent, or Firm—Burns, Doane, Swecker & Mathis, L.L.P.

(57) ABSTRACT

The invention relates to a DFB fiber laser sensor (1). A measurement quantity makes it possible to induce a linear birefringence between mode pairs of the laser-amplifying fiber (2) and to measure an associated beat frequency ($\Delta v_1$, $\Delta v_2$, $\Delta v_3$). According to the invention, the laser-amplifying fiber (2) has a nonrotationally symmetrical structure, so that it is possible to detect isotropic pressures p, acoustic waves or chemical substances that can be added radially to the laser-amplifying fiber (2). In a second aspect of the invention, an emission wavelength range and parameters (a, b, $\Delta N$) of the laser-amplifying fiber (2) and also a grating period L of the fiber Bragg grating resonator (3) are coordinated with one another such that at least two different spatial modes ($LP_{01}$, $LP_{11}^{even}$, $LP_{11}^{odd}$, $LP_{21}^{even}$) are propagatable and it is possible to measure beat frequencies ($\Delta v_1$, $\Delta v_2$, $\Delta v_3$) between oscillatory longitudinal laser modes assigned to them. Exemplary embodiments relate to: rotationally asymmetrical fiber types, a choice of special spatial modes ($LP_{11}^{odd}$, $LP_{21}^{even}$) and/or multiple fiber Bragg gratings (3) for reducing the beat frequencies ($\Delta v_1$, $\Delta v_2$, $\Delta v_3$) below 100 GHz; and elimination of temperature influences e.g. by the detection of a plurality of beat frequencies ($\Delta v_a$, $\Delta v_b$, $\Delta v_c$, $\Delta v_d$) between different pairs of spatial modes ($LP_{01}$, $LP_{11}^{even}$, $LP_{11}^{odd}$, $LP_{21}^{even}$) and/or polarization modes (X, Y).

14 Claims, 8 Drawing Sheets

OTHER PUBLICATIONS

D. C. J. Reid et al., "Phase–Shifted Moire Grating Fibre Resonators", Electronics Letters, Jan. 4, 1990, vol. 26, No. 1 pp. 10–12.

Katsuyuki Utaka et al., "N4–Shifted InGaAsP/InP DFB Lasers", IEEE Journal of Quantum Electronics, vol. QE–22, No. 7, Jul. 1986, pp. 1042–1051.

R. C. Alferness et al., "Narrowband Grating Resonator Filters in InGaAsP/InP Waveguides", 1986, Appl. Phys. Lett. vol. 49, No. 3, Jul. 21, 1986, pp. 125–127.

Oliver Hadeler et al., "Polarimetric Distributed Feedback Fiber Laser Sensor for Simultaneous Strain and Temperature Measurements", Applied Optics, vol. 38, No. 10, Apr. 1, 1999 pp. 1953–1958.

J. T. Kringlebotn et al., "Polarimetric $Er^{3+}$–Doped Fiber Distributed–Feedback Laser Sensor for Differential Pressure and Force Measurements", pp. 1869–1871.

M. Sejka et al., "Distributed Feedback $Er^{3+}$–Doped Fibre Laser", Electronics Letters, Aug. 17, 1995, vol. 31, No. 17.

W. H. Loh et al., "1.55μm Phase–Shifted Distributed Feedback Fibre Laser", Electronic Letters, Aug. 17, 1995, vol. 31, No. 17, pp. 1440–1442.

J.T. Kringlebotn et al., "$Er^{3+}$:$Yb^{3+}$–Codoped Fiber Distributed–Feedback Laser", Optics Letters, Dec. 15, 1994. vol. 19, No. 24, pp. 2101–2103.

J. T. Kringlebotn et al., "Highly–Efficient, Low–Noise Grating–Feedback $Er^{3+}$:$Yb^{3+}$ Codoped Fibre Laser", Electronics Letters, Jun. 9, 1994, vol. 30, No. 12, pp. 972–973.

J. L. Zyskind et al., "Short Single Frequency Erbium–Doped Fibre Laser", Electronics Letters, Jul. 16, 1992, vol. 28, No. 15, pp. 1385–1387.

* cited by examiner

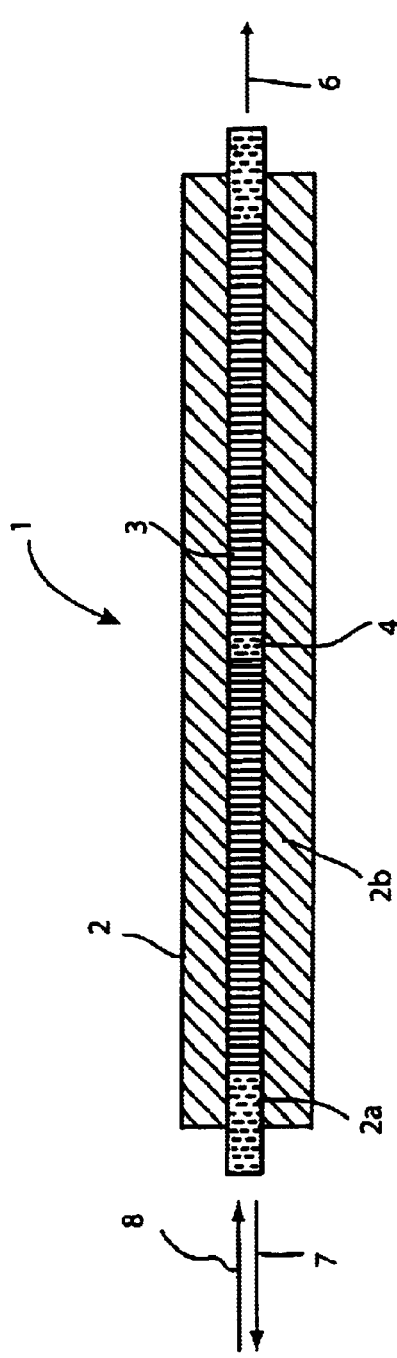
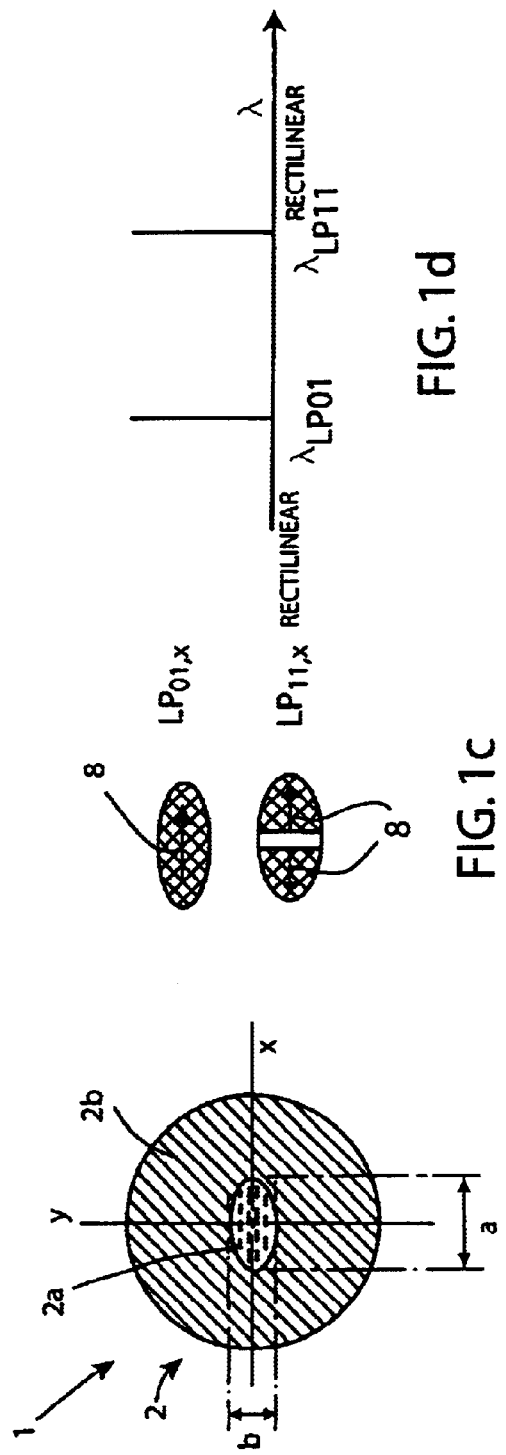

ANISOTROPIC DISTRIBUTED FEEDBACK FIBER LASER SENSOR

FIELD OF THE INVENTION

The present invention relates to the field of fiber-optical measurement technology. It is based on a fiber laser sensor according to the preamble of the independent claims.

BACKGROUND OF THE INVENTION

In oil production it is necessary to monitor boreholes with regard to pressure and temperature. In the borehole, the liquid pressures can be up to approximately 100 MPa (1000 bar) and the temperatures can be up to above 200° C. Electrical sensors, such as e.g. piezoresistors, piezoelectric elements, capacitive probes or crystal resonators or optical pressure sensors, such as e.g. Fabry-Perot resonators, or elasto-optical sensors, are often used for pressure measurement up to approximately 170° C.

U.S. Pat. No. 5,844,927 discloses a DFB fiber laser sensor in accordance with the preamble of the independent claims. What is disclosed is a laser-amplifying fiber with a distributed fiber Bragg grating resonator in which two orthogonally polarized modes can oscillate with slightly different wavelengths. In the case where the laser-amplifying fiber is used as a sensor fiber, as a result of a transverse force, a birefringence is induced between the polarization modes and is measured as force-proportional beat frequency. Spectrally separate serial and parallel multiplex arrangements of a plurality of fiber laser sensors are also specified. What is disadvantageous is that use is made exclusively of two polarization modes, namely the spatial fundamental mode of the fiber with its two orthogonal linear polarization states, and an isotropic pressure cannot be measured.

WO 99/44023 discloses a fiber laser pressure sensor in which a laser-amplifying fiber and a sensor fiber are arranged between two fiber Bragg grating end reflectors. The sensor fiber has an asymmetry in such a way that, as a result of isotropic pressure, a birefringence can be induced between two linear polarization modes or between the $LP_{01}$, and $LP_{11}^{even}$ spatial modes and can be measured as pressure-proportional beat frequency. In accordance with WO 00/39552 in such an arrangement, differential pressures can also be measured by means of two sensor fiber segments rotated by 90° with respect to one another. Disadvantages of these sensors include the limited dynamic range, since induced optical phase shifts can be unambiguously detected only up to a maximum value of 90°, and the low stability of the laser emission. In addition, the fabrication is complicated because the fiber segments have to be coordinated with one another and be arranged in separate pressure chambers.

SUMMARY OF THE INVENTION

It is an object of the present invention to specify a DFB fiber laser sensor which is suitable for the frequency-coded measurement of isotropic pressures, acoustic waves or chemical substances. This object is achieved according to the invention by means of the features of the independent claims.

In a first aspect, the invention consists in a fiber laser sensor which has a DFB fiber laser with a laser-amplifying fiber and a fiber Bragg grating written in distributed fashion therein, a measurement quantity making it possible to induce a birefringence and beat frequency between modes of the laser-amplifying fiber and measurement means for determining the beat frequency being present, in which case, furthermore, the measurement quantity is an isotropic pressure acting radially on the laser-amplifying fiber or a chemical substance which can be added radially to the laser-amplifying fiber, and the laser-amplifying fiber has a nonrotationally symmetrical structure in such a way that the isotropic pressure or the chemical substance make it possible to induce the birefringence and beat frequency between one or a plurality of pairs of modes of the laser-amplifying fiber. The nonrotationally symmetrical structure means that for the first time a DFB fiber laser sensor with radially anisotropic pressure sensitivity or radially anisotropic deposition sensitivity is provided. The dynamic range is enlarged compared with the fiber laser pressure sensors with a separate sensor fiber and discrete end reflectors. Since laser fiber, sensor fiber and fiber Bragg grating resonator are integrated in one fiber element, the sensor can be produced very simply, is extremely compact and can be packaged simply in a single-chamber housing. It is extremely well suited particularly to the reliable measurement of isotropic liquid pressures in oil boreholes. For the measurement of chemical substances, the sensor can be calibrated with regard to type and concentration of the substances in an addition layer.

One exemplary embodiment relates to types of suitable laser-amplifying fibers, namely those with an elliptical core, a "bow-tie" structure, a "panda" structure, a "side-hole" structure, a "D-shape" structure, an elliptical fiber cladding or a partially ground fiber cladding. The laser-amplifying fiber may also be a microstructured fiber with a nonrotationally symmetrical structure.

Other exemplary embodiments relate to the type of modes, which are identical or different transverse spatial modes with mutually orthogonal linear polarization, or else different transverse spatial modes with identical linear polarization. In particular, for a laser-amplifying fiber with an elliptical core, an emission wavelength range and parameters and also a grating period L of the fiber Bragg grating resonator may be coordinated with one another such that at least two, in particular exactly two or four, different spatial modes are propagatable in the emission wavelength range at Bragg wavelengths of the fiber Bragg grating resonator. In that case, longitudinal laser modes associated with the transverse spatial modes can be excited, and are capable of oscillation, in the laser-amplifying fiber. Preferably, additional means are present which are configured for the spatially selective coupling-out and detection of at least one interference pattern component of different spatial modes with a nonvanishing contrast in the resulting beat signal. In that case, it is possible to measure beats or the frequencies thereof e.g. between a fundamental and a first higher even spatial mode, between a first higher odd and a second higher even mode and/or between identical, in particular fundamental, spatial modes, with different linear polarization. In the second case, the parameters of the laser-amplifying fiber, in particular lengths of the core-ellipse principal axes and a core-sheath refractive index difference, are preferably chosen in a range of values in which the beat frequency is less than 100 GHz, and preferably less than 10 GHz, and, in particular, lies in proximity to a zero crossing. By choosing a relatively small beat frequency, standard components may be used as measurement means, in particular as frequency filters and frequency counters.

In a further exemplary embodiment, two fiber Bragg grating resonators are written into the laser-amplifying fiber one above the other, in overlapping fashion or in spatially separate fashion, and a ratio of grating periods of the fiber Bragg grating resonators is chosen to be approximately equal to a ratio of effective refractive indices of two different spatial modes, preferably of the fundamental and first higher even spatial mode, or of two identical spatial modes with orthogonal linear polarization. As a result, it is possible to prescribe the beat frequency without pressure to a value of essentially zero.

Additional exemplary embodiments relate to means for determining a temperature of the fiber laser sensor and for correcting a temperature dependence of a signal, and in particular pressure signal, of the fiber laser sensor. For temperature determination, the means may be e.g. a wavelength multiplexer with a suitably wavelength-dependent coupling-out ratio, with which an emission or laser wavelength, i.e. an oscillatory Bragg wavelength, of the fiber laser sensor can be measured. The means may also be configured for measuring a plurality of beat frequencies and for separately determining a pressure change $\delta p$ and temperature change $\delta T$ with the aid of known temperature and pressure coefficients of the beat frequencies of the fiber laser sensor. For inherent temperature compensation, Bragg wavelengths assigned to a fundamental spatial mode and a first higher even spatial mode may also be prescribed, through a choice of the parameters of the laser-amplifying fiber and of the grating period $\Lambda$ of the fiber Bragg grating resonator, such that group velocities of said spatial modes are of identical magnitude at the respective Bragg wavelength.

In one important exemplary embodiment, the measurement quantity is a temporally varying pressure p, in particular an acoustic wave or a seismic wave. In order to improve the acoustic impedance matching to a sound-transmitting medium, the laser-amplifying fiber may be provided with a coating made, for example, of polyurethane.

In a second aspect, the invention consists in a fiber laser sensor which comprises a DFB fiber laser with a laser-amplifying fiber and a fiber Bragg grating resonator written in distributed fashion therein, a measurement quantity making it possible to induce a birefringence and beat frequency between modes of the laser-amplifying fiber and measurement means for determining the beat frequency being present, in which case, furthermore, the laser-amplifying fiber has a nonrotationally symmetrical structure, and an emission wavelength range and parameters of the laser-amplifying fiber are chosen in such a way that the emission wavelength range and a wavelength range in which at least two different spatial modes are propagatable overlap in a spectral region, and at least one grating period $\Lambda$ of the fiber Bragg grating resonator is chosen in such a way that Bragg wavelengths assigned to the different spatial modes lie in the spectral region. Thus, at least two of the different spatial modes in the spectral region are intended to have in each case at least one Bragg wavelength at which a longitudinal laser mode assigned to the spatial mode is oscillatory.

Further embodiments, advantages and applications of the invention emerge from dependent claims and also from the description which now follows and from the figures.

BRIEF DESCRIPTION OF THE DRAWINGS

In the figures, for a DFB fiber laser sensor according to the invention:

FIGS. 1a–1d show a bimodal laser-amplifying fiber with an elliptical core in side view and in cross section, spatial mode intensity distributions and an associated laser mode spectrum;

Identical parts are provided with identical reference symbols in the figures.

DETAILED DESCRIPTION OF THE INVENTION

Figure 2:
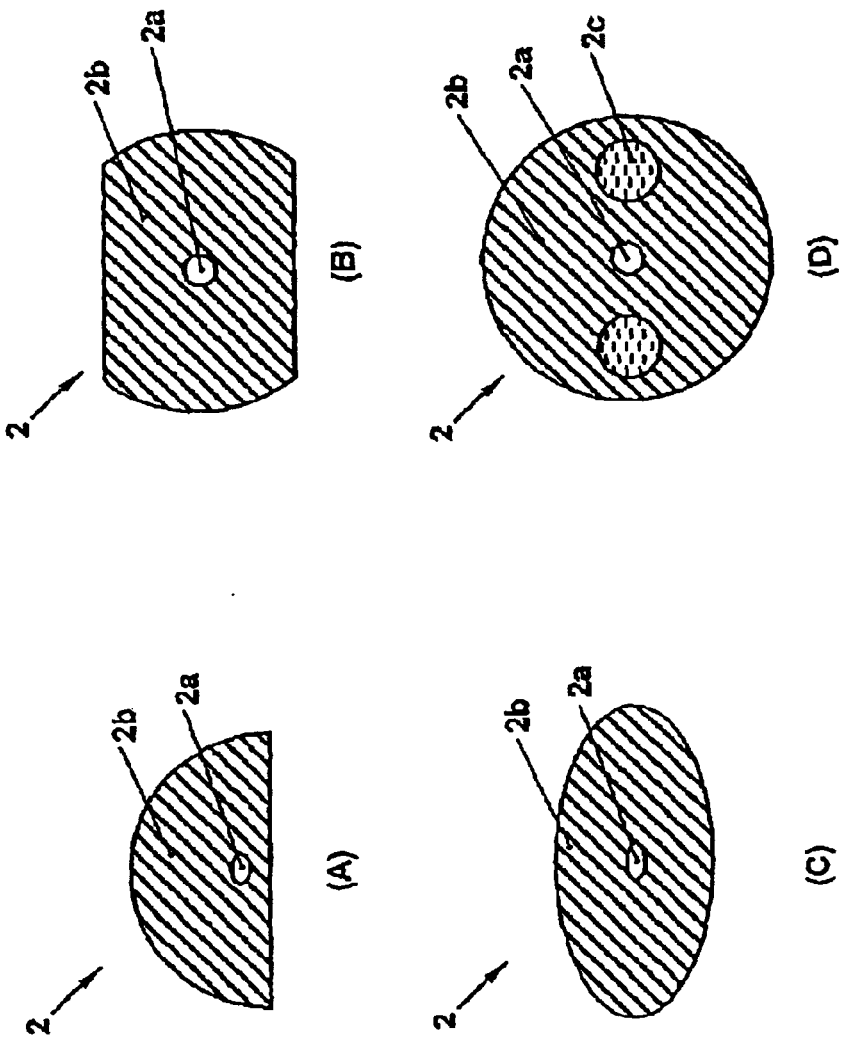
FIG. 2 shows examples of nonrotationally symmetrical fibers.

FIGS. 1a and 1b diagrammatically show the sensor part of a DFB fiber laser sensor 1 according to the invention. The laser 1 comprises a laser-amplifying fiber 2 for example having an elliptical core 2a and a round fiber cladding 2b. Linear polarization axes x, y are prescribed by the long principal axis a and the short principal axis b of the core 2a. The core 2a is doped with rare earth ions. The type of ions depends on the desired emission wavelength range of the laser 2. Erbium/ytterbium- or erbium-doped laser-amplifying fibers 2 are preferably used, whose emission lies in the range of between about 1520 nm and 1560 nm. Instead of being doped with erbium, the fiber can also be doped with other rare earth ions, e.g. praseodymium (emission around 1300 nm), neodymium (emission around 1060 mm) or thulium (emission around 810 nm). The wavelength of the pumping laser 13 (FIGS. 8, 9) must be adapted correspondingly.

The laser resonator 3 is formed by an individual Bragg grating 3 which is written into the fiber 2. In contrast to this, customary lasers or fiber lasers 2 have two separate reflectors or gratings which form a Fabry-Perot resonator. The length of the grating 3 is typically a few cm. In order that the grating can act as a resonator 3 for laser waves 6, 7 that are typically excited by pumping light 5 and oscillate at a Bragg wavelength $\lambda$ of the fiber Bragg grating 3, the grating structure must have a phase jump of $\pi$ (or $\pi+2*m*\pi$ where m=integer) at one location. This corresponds to a jump in the optical phase of $\pi/2$ (or $\pi/2+m*\pi$ or $\lambda/4+m*\lambda/2$). The phase jump is preferably situated in the center 4 of the grating 3. Without such a phase jump, a DFB laser 2 does not oscillate as generally desired on a single longitudinal laser mode, but rather on two longitudinal modes which are symmetrical with respect to the Bragg wavelength $\lambda$ at the two edges of the so-called stop band of the grating 3. In addition, the laser threshold is higher. If the grating 3 contains a phase jump of $\pi$, then a standing wave having the wavelength $\lambda$ forms within the grating 3. The amplitude of the electric field decreases exponentially with increasing distance from the location of the phase discontinuity.

As is known, the $\pi$ phase jump in the fiber Bragg grating 3 can be generated in various ways. The grating 3 can be irradiated with UV light (e.g. at 240 nm) in the center over a length of about 1 mm. The UV irradiation changes the refractive index of the fiber and thus leads to the desired phase jump in the grating period. The phase jump can also be generated nonpermanently by local heating of the grating. Furthermore, it is possible to use a Moiré grating formed by two superposed gratings with slightly different periods whose phase difference accumulated over the grating length amounts to it $\pi+2*m*\pi$. A further method is to write the Bragg grating 3 with the aid of a special phase mask which already contains a $\pi$ phase jump.

The rotational asymetry of the laser-amplifying fiber 2 signifies that there is an angle of rotation about the fiber longitudinal axis at which the fiber 2 cannot be transferred into itself again. The rotationally asymmetrical structure of the laser-amplifying fiber 2 serves to provide an anisotropy for converting an isotropic pressure p into an induced linear birefringence between orthogonal polarization modes X, Y and/or differential spatial modes of the fiber 2. Typically, there is already an inherent linear birefringence in the unloaded state, namely between orthogonal polarization modes X, Y in the majority of fibers and between spatial modes in all fibers. In addition to fibers 2 with an elliptical core (shape-induced inherent birefringence between polarization modes), those having a "bow-tie" or "panda" structure (stress-induced inherent birefringence between polarization modes) are also customary. These types are presented in the article by K. -H. Tsai et al., "General Solutions for Stress-Induced Polarization in Optical Fibers", Journal of Lightwave Technology Vol. 9, No. 1, (1991). FIG. 2 shows, as further examples of laser-amplifying fibers 2 with inherent birefringence that can be induced by isotropic pressure or chemical substances which can be added isotropically, a fiber (A) with an elliptical core 2a and ground cladding 2b ("D-shape" structure), a fiber (C) with an elliptical core 2a and an elliptical fiber cladding 2b and a fiber (D) with a round core 2a, a round cladding 2b and side holes 2c ("side-hole" structure). A special feature is represented by a fiber in accordance with (A) with a round core 2a and the fiber (B) with a round core 2a and a partially ground, rotationally asymmetrical fiber cladding 2b. These fibers are inherently free from birefringence with regard to polarization modes in the unloaded state. In the case of the fiber (B) the fiber cladding 2b can be ground on one side, two sides or a plurality of sides, with the result that isotropic pressure cancels the degeneracy of pure polarization modes X, Y (with identical spatial mode structure) and makes it possible to induce a pressure-proportional birefringence. Further examples are so-called microstructure fibers with a nonrotationally symmetrical structure, such as "photonic crystal fibers" or "photonic bandgap fibers" or "holey fibers", described e.g. in B. J. Eggleton, Journal of Lightwave Technologies, Vol. 18, pp. 1084–1099 (2000).

The case of an elliptical core fiber 2 is discussed in more detail below. Parameters of the elliptical core fiber 2 are the difference $\Delta N=N_1-N_2$ between the refractive indices $N_1$, $N_2$ of fiber core 2a and fiber cladding or sheath 2b, the length ratio e=a/b of the principle axes a, b of the elliptical fiber core 2a and also the absolute length a of the large principal axis. In one exemplary embodiment, these parameters a, b, $\Delta N$ or e, a, $\Delta N$ are chosen such that the two spatial fiber modes $LP_{07}$ and $LP_{11}^{even}$ (corresponding to $HE_{11}$ and $HE_{21}$ in different notation) are propagatable at the Bragg wavelengths $\lambda_{01}$, $\lambda_{11}^{even}$ which can be defined by the geometrical grating period $\Lambda$ of the fiber Bragg grating 3. On the other hand, the Bragg wavelengths $\lambda_{LP01}$, $\lambda_{LP11}^{even}$ must also lie in the emission wavelength range of the laser-amplifying fiber 2. In that case, two longitudinal laser modes which are assigned to the two spatial modes $LP_{01}$ and $LP_{11}^{rectlinear}$ are capable of oscillation or excitation (FIG. 1c). Firstly, let it be assumed that light oscillates only with a linear polarization, preferably x parallel to the long principal axis a of the core 2a. The laser 2 then contains two standing wave fields associated with the two spatial fiber modes $LP_{01}$, and $LP_{11}^{even}$. Since the effective refractive indices $n_{LP01}$ and $n_{LP11}^{even}$ of the two spatial modes $LP_{01}$, $LP_{11}^{even}$, differ somewhat, the Bragg wavelengths $\lambda_{LP01}$, $\lambda_{LP11}^{even}$ of the two modes $LP_{01}$, $LP_{11}^{rectlinear}$ are also different, and the laser 2 oscillates at two different emission or laser wavelengths $\lambda_{LP01}$ and $\lambda_{LP11}^{even}$:

$$\lambda_{LP01}=2*n_{LP01}*\Lambda \tag{E1}$$

$$\lambda_{LP11}^{even}=2*n_{LP11}^{even}*\Lambda \tag{E2}$$

What corresponds to the refractive index difference $\Delta n=n_{LP01}-n_{LP11}^{even}$ of the spatial modes $LP_{01}$ and $LP_{11}^{even}$ is the wavelength difference $\Delta\lambda=\lambda_{LP01}-\lambda_{LP11}^{rectlinear}$ or the optical frequency difference or the beat frequency $$\Delta v=(C/\lambda^2)*\Delta \tag{E3}$$

where c denotes the speed of light and $\lambda$ denotes the average wavelength. As a consequence of the frequency difference $\Delta v$, the intensity of the laser emission is modulated with the beat frequency $\Delta v$.

If the fiber is exposed to a pressure on all sides, then the fiber cross section is compressed somewhat and the fiber length is increased somewhat. The refractive indices $N_1$ and $N_2$ of core and sheath change on account of the elasto-optical effect. The difference $\Delta n=n_{LP01}-n_{LP11}^{even}$ between the effective refractive indices of the two spatial modes changes by $\delta(\Delta n)$ and the grating period changes by $\Delta\Lambda$. The changes are proportional to the pressure. Owing to $\Delta\lambda=2*\Delta n*\Lambda$, the change in the wavelength difference $\delta(\Delta\delta)$ in the case of a pressure change $\delta p$ can be written as $$\delta(\Delta\lambda)/\delta p=2*\Lambda[\delta(\Delta n)/\Delta p+(\Delta n/\Lambda)*(\delta\Lambda/\delta p)] \tag{E4}$$

The corresponding frequency shift per pressure change $\delta(\Delta v)/\delta p$ is $$\delta(\Delta v)/\delta p=2*(c/\lambda^2)*\Lambda*[\delta(\Delta n)/\delta p+(\Delta n/\Lambda)*(\delta\Lambda/\delta p)] \tag{E5}$$

The relative changes in the wavelength difference $\delta(\Delta\lambda)/\Delta\lambda$ and the beat frequency $\delta(\Delta v)/\Delta v$ are $$\delta(\Delta\lambda)/\Delta\lambda=\delta(\Delta v)/\Delta v=\delta(\Delta n)/\Delta n+\delta\Lambda/\Lambda \tag{E6}$$

The pressure-dependent term $A=\delta(\Delta n)/\delta p+(\Delta n/\Lambda)*(\delta\Lambda/\delta p)$ in equations (E4), (E5) was determined experimentally for a two-mode fiber where $a\approx 4$ $\mu m$, e=2 and $\Delta N=0.056$: $A=2.1*10^{-7}$ $MPa^{-1}$ for $\lambda=1310$ nm. This results, for a 1310 nm laser, in a frequency shift as a function of the pressure of approximately 28 MHz/mPa.

The refractive index difference $\Delta n=n_{LP01}-n_{LP11}^{even}$ of the two spatial modes $LP_{01}$ and $LP_{11}^{even}$ is dependent on the abovementioned fiber parameters a, b, $\Delta N$ and the wavelength $\lambda$. For a given ellipticity e=a/b of the core 2a, $\Delta n$ is greater, the greater the difference $\Delta N$ between the refractive indices of fiber core 2a and sheath 2b. For given refractive indices $N_1$, $N_2$ of core and sheath, $\Delta n$ increases as the ellipticity e of the core 2a decreases.

Figure 3A:
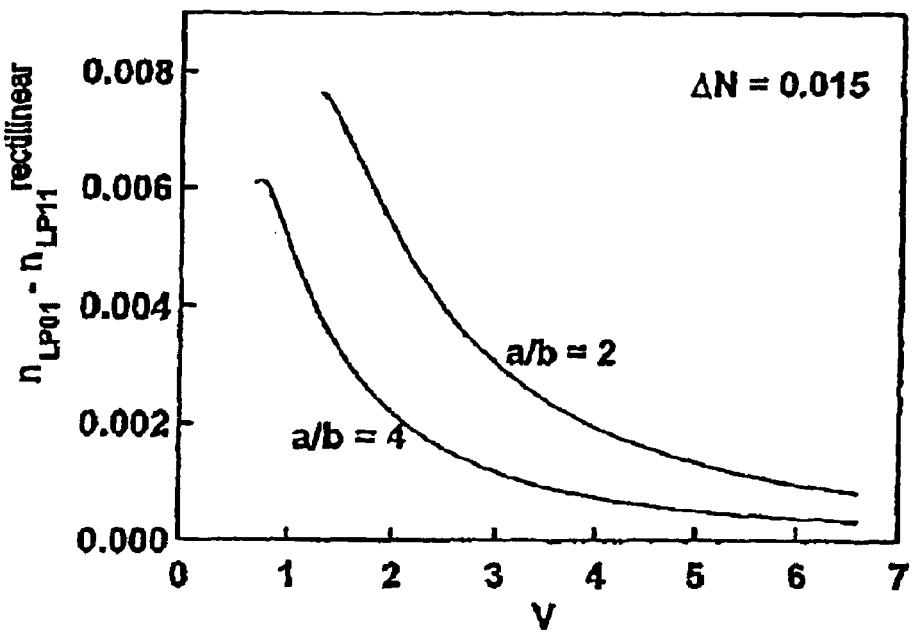
FIGS. 3–5 show examples of effective refractive differences and beat frequencies of spatial modes and polarization modes in elliptical core fibers.

FIG. 3a shows $\Delta n$ as a function of the normalized frequency V for $\Delta N=0.015$ and two different core ellipticities e=2 and e=4. The normalized frequency V is inversely proportional to the wavelength $\lambda$:

$$V=(2\pi/\lambda)*(b/2)*(N_1^2-N_2^2)^{1/2} \tag{E7}$$

Figure 3B:
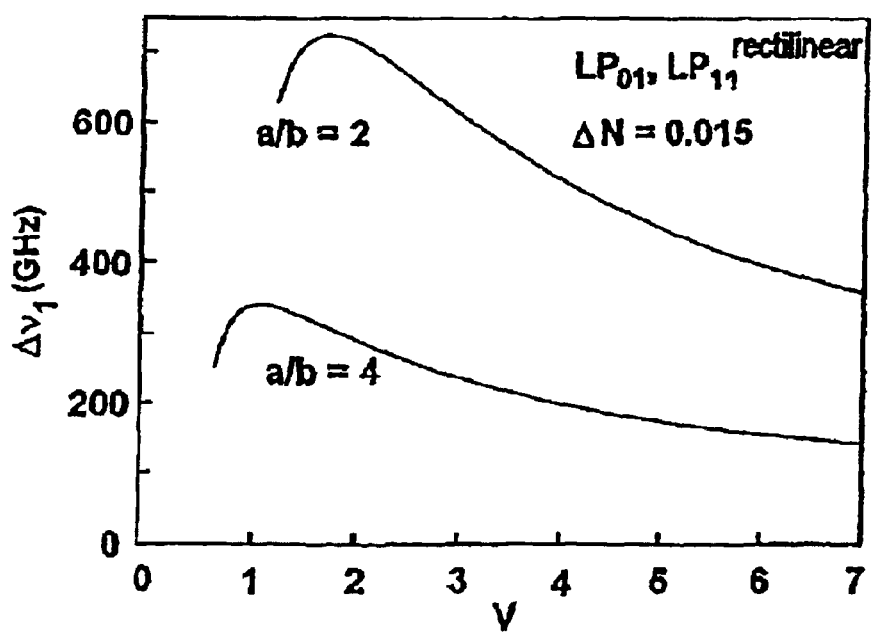

FIG. 3b shows the resulting beat frequencies $\Delta v_1(V)$ as a function of V in accordance with the equation:

$$\Delta v(V)=c*(\Delta n(V)/n)*(V/b)*\pi^{-1}*(N_1^2-N_2^2)^{-1/2} \tag{E8}$$

where n=average effective mode refractive index. Equation (E8) can be derived from (E3) with the aid of (E1), $\Delta\lambda=2*\Delta n*\Lambda$ and (E7). The curves in FIG. 3b are based on a length b of the small core axis of 4.66 μm. A wavelength $\lambda$=1535 nm (erbium-doped fiber) then corresponds to a normalized frequency V=2.

For fibers having customary values of $\Delta N$ and e, the beat frequencies $\Delta v_1$ lie in the range above 100 GHz and, therefore, cannot be measured in a simple manner. Therefore, variants of the sensor are specified below in the case of which smaller beat frequencies occur which can be registered by commercial photodetectors 16, 20 and signal analyzers, 17, 21. Specific higher spatial modes and/or superposed fiber Bragg grating resonators 3 can be used for this purpose.

In one exemplary embodiment, the DFB fiber laser 2 is operated with four spatial modes. The difference in the effective refractive indices $\Delta n = n_{LP01} - n_{LP11}$ between the $LP_{01}$, and the even $LP_{11}$, mode is relatively large. This leads to relatively large beat frequencies $\Delta v_1$ which, depending on the fiber parameters a, b, $\Delta N$, may lie outside the frequency range which can be detected by commercial measurement systems. Significantly smaller beat frequencies $\Delta v_2$ can be achieved if the fiber is dimensioned such that four (or more) spatial modes are propagatable: $LP_{01}$, $LP_{11}^{even}$, $LP_{11}^{odd}$ (also called $HE_{12}$ and even $LP_{21}$ mode (also called $HE_{31}$). Thus, e.g. for a fiber where approximately e=2, the refractive index difference $n_{LP11}^{odd} - n_{LF21}^{even}$ between the $LP_{11}^{odd}$ and the $LP_{21}^{even}$ mode is small and has a zero crossing at V=3.2.

Figure 4A:
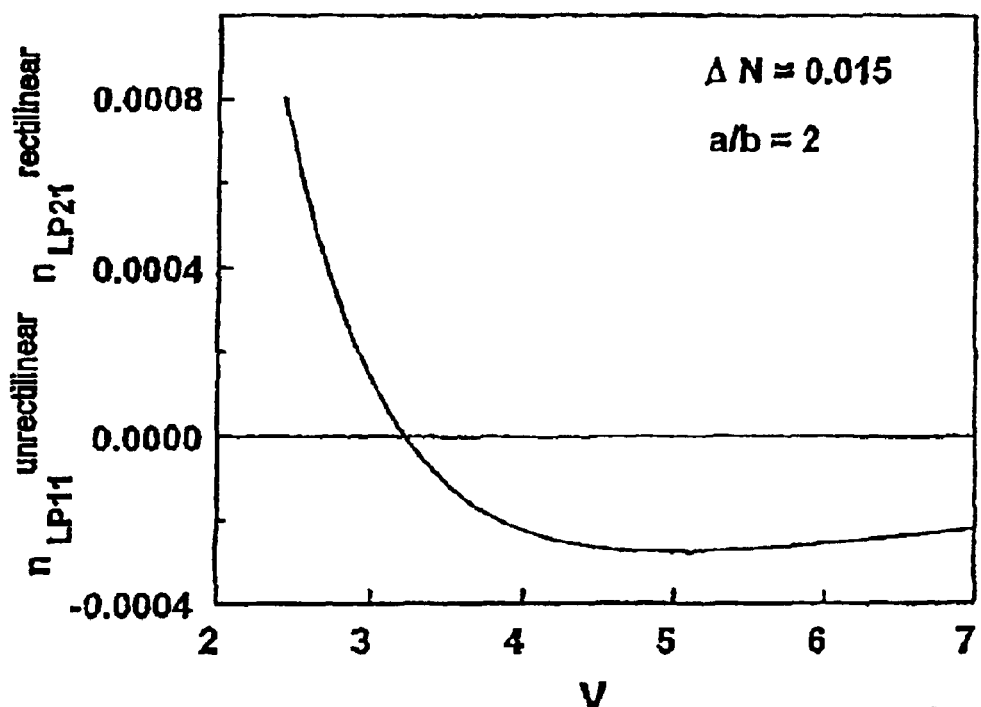
Figure 4B:
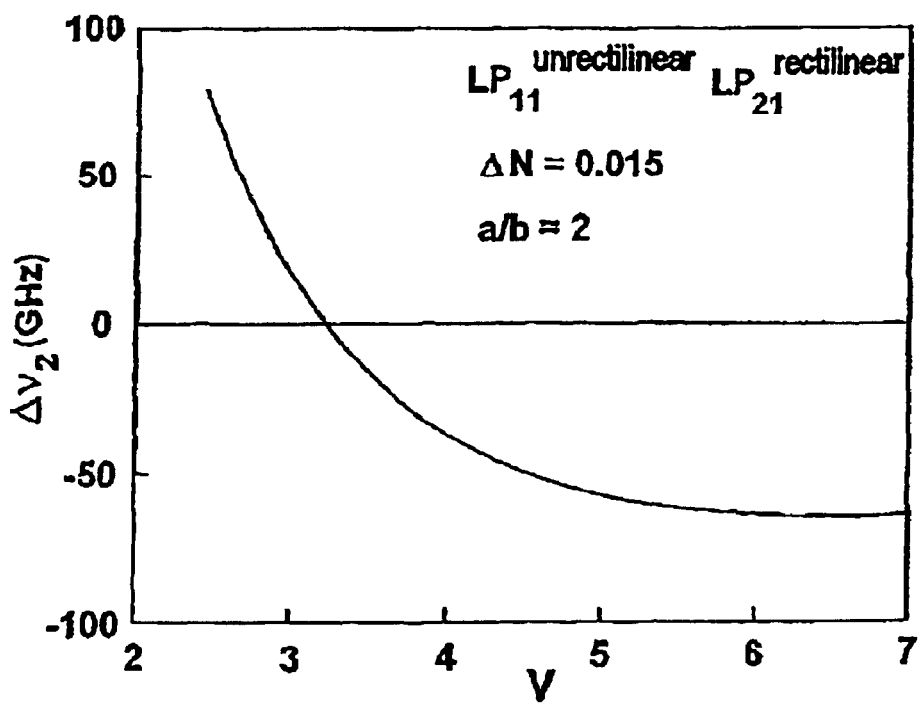

FIGS. 4a and 4b show, for e=2 and $\Delta N$=0.015, the difference $n_{LP11}^{odd} - n_{LP21}^{ever}$ and also the resulting beat frequency $\Delta v_2$ as a function of v. The beat frequencies $\Delta v_2$ now lie in a range in which they can be measured by customary means 16–21. The function $\Delta v_2 = \Delta v_2(V)$ is calculated for b=7.53 μm. In this case, the zero crossing of $\Delta v_2(V)$ corresponds to a wavelength $\lambda$=1535 nm.

In a further exemplary embodiment, the fiber laser 2 is operated with two spatial modes in two superposed fiber Bragg grating structures 3. In this case, the fiber parameters a, b, $\Delta N$ are preferably chosen such that the two lowest-order spatial modes are propagatable ($LP_{01}$, and $LP_{11}^{even}$ modes). The fiber 2 then contains, instead of an individual Bragg grating 3, two gratings 3 which are written one above the other, in overlapping fashion or in spatially separate form and whose grating periods $\Lambda_1$ and $\Lambda_2$ are chosen such that the Bragg wavelengths $\lambda_{LP01}$ and $\lambda_{LP11}^{even}$ assigned to the two spatial modes $LP_{01}$, and $LP_{11}^{even}$ are at least approximately identical in the absence of an applied pressure p:

$$\lambda_{LP01} = \lambda_{LP11}^{even} \tag{E9}$$

Owing to $\lambda_{LP01}=2*n_1*\Lambda_1$ and $\lambda_{LP11}^{even}=2*n_2*\Lambda_2$, where $n_1 = n_{LP01}$ and $n_2 = n_{LP11}^{even}$, the ratio of the grating periods $\Lambda_1$, $\Lambda_2$ of the fiber Bragg gratings 3 is thus to be chosen at least approximately as follows:

$$\Lambda_2/\Lambda_1 = n_1/n_2 \tag{E10}$$

The beat frequency $\Delta v_1$ in the absence of pressure is then zero. The two individual gratings 3 each again have a phase jump of π. Superposed gratings 3 can also be applied correspondingly to other mode-pair beat frequencies.

For a fiber where $\Delta N$=0.015 and e=2 which is operated at a normalized frequency V=2, $\Delta n = n_{LP01} - n_{LP11} = 5.3*10^{-3}$ (FIG. 3a). In this case, $\Lambda_1$ and $\Lambda_2$ must be chosen to differ by 1.6 nm and be approximately 455 nm in order that the two emitted wavelengths $\lambda_{LP01}$ and $\lambda_{LP11}$ are identical and are approximately 1535 nm. In this case, the absolute size of the core 2a must be chosen such that 1535 nm corresponds to a normalized frequency V=2. The following are obtained from equation (E7) where $N_2$=1.475 and $N_2$=1.46: b=4.65 μm and, consequently, a=9.3 μm.

Besides $\lambda_{LP01}$ and $\lambda_{LP11}$ there are two further emission wavelengths $\lambda'_{LP01}=2*n_2*\Lambda_1$, and $\lambda'_{LP11}=2*n_1*\Lambda_2$. Their difference $\Delta\lambda'4*\Delta n*\Lambda_1$ is twice as large as in the case of a single grating 3. The resulting beat frequency is generally very high and is not detected.

In the examples specified above, it is assumed that the spatial modes are excited only with one polarization direction, namely parallel to the large or small principal axis a or b of the elliptical fiber core 2a; the specified curves are calculated for a polarization parallel to the large principal axis a. If the laser emission 6, 7 takes place on both polarization directions x, y, then on account of the birefringence of the fiber, additional emission or laser wavelengths and beat frequencies occur which can likewise be detected by the measurement means 15–21 and can be used e.g. for temperature compensation.

Other exemplary embodiments relate to a polarimetric fiber laser sensor 1 according to the invention. A single grating structure 3 and only the fundamental mode $LP_{01}$ are considered in a first variant. Both polarization modes X and Y are excited. The laser emission 6, 7 takes place at the wavelengths $$\lambda_{LP01.x} = 2*n_{LP01.x}*\Lambda \tag{E11}$$

$$\lambda_{LP01.y} = 2*n_{LP01.y}*\Lambda \tag{E12}$$

where $n_{LP01.x}$ and $n_{LP01.y}$ are the effective refractive indices for the two polarization directions x, y and $\Lambda$ is the geometrical grating period of the Bragg grating 3.

Figure 5A:
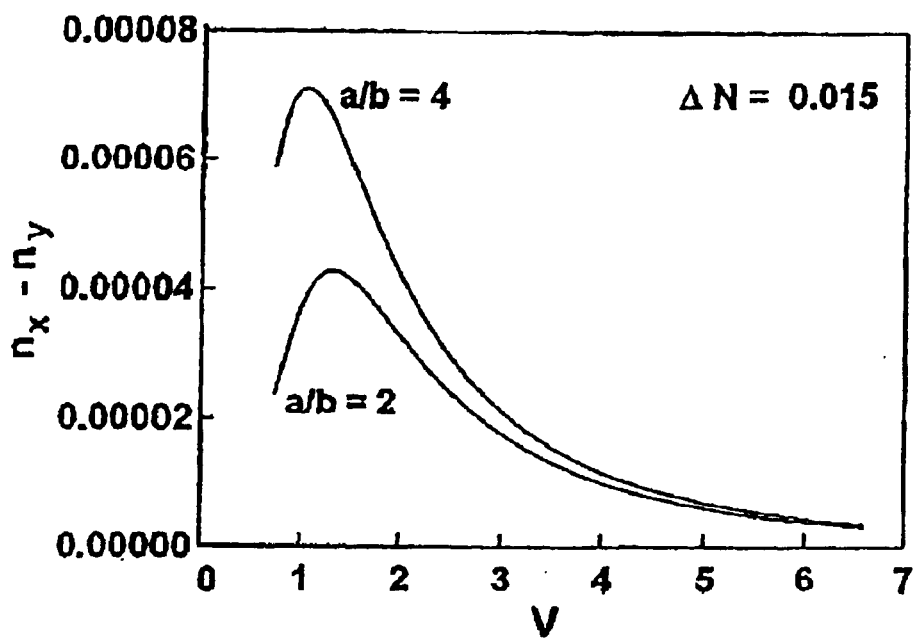
Figure 5B:
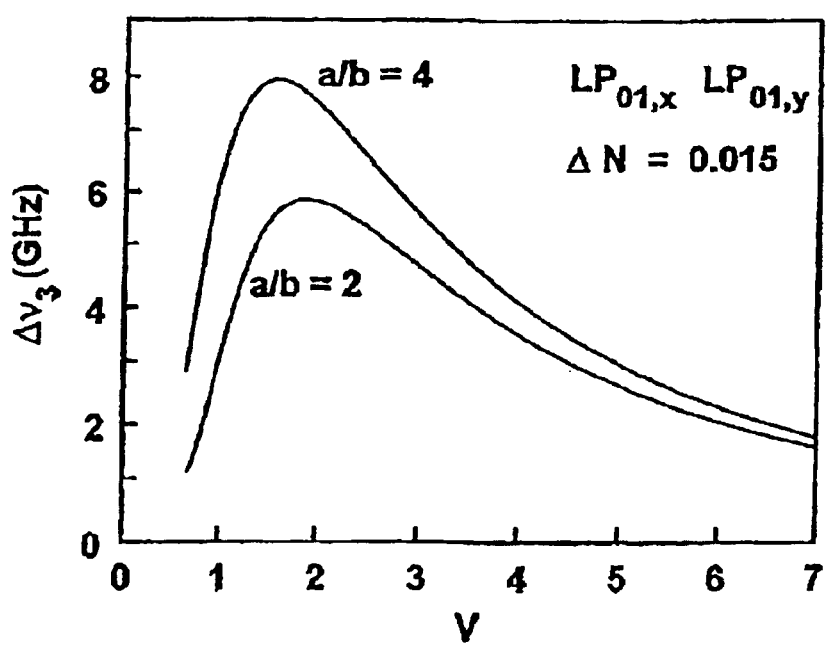

The resulting beat frequency $\Delta v_3$ again results in accordance with equation (E3) where $\Delta\lambda = \lambda_{LP01.x} - LP_{01.y}$. FIGS. 5a and 5b show the refractive index difference $n_{LP01.x} - n_{LP01.y}$ and the resulting beat frequency $\Delta v_3$ as a function of the normalized frequency V, once again for fibers where $\Delta N$=0.015 and e=2 and $\Delta N$=0.015 and e=4. The curves in FIG. 5b are calculated for b=3.50 μm. A wavelength $\lambda$=1535 nm then corresponds to V≈=2. The beat frequencies $\Delta v_3$ lie in the region of a few GHz and can thus easily be measured.

The pressure-dependent term $A=\delta(\Delta n)/\delta p + (\Delta n/\Lambda)*(\delta\Lambda/\delta p)$ in equations (E4), (E5) was determined experimentally for a polarimetric sensor fiber (a≈4 μm, e=2, $\Delta N$=0.031): $A=0.4*10^{-7}$ MPa$^{-1}$ for $\Lambda$=1535 nm. This results in a frequency shift of 5.4 MHz/mPa.

In a second variant, the Bragg grating structure 3 comprises, as before, two superposed gratings 3 having spatial periods $\Lambda_1$ and $\Lambda_2$, which are chosen such that the beat frequency $\Delta v_3$ is approximately zero in the absence of an applied pressure p. The following holds true here for the ratio of the grating periods $$\Lambda_2/\Lambda_1 = n_1/n_2 = n_{LP01.x}.n_{LP01.y} \tag{E13}$$

Each individual grating again contains a phase jump of π.

Figure 6A:
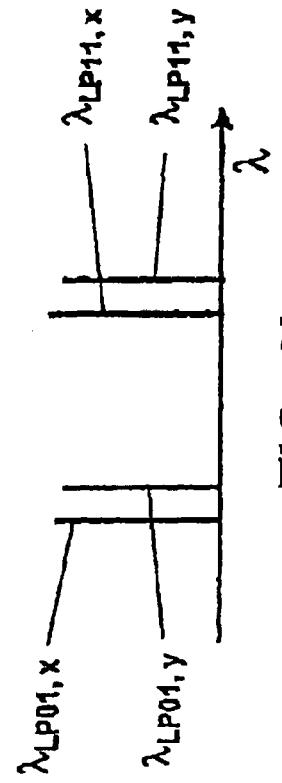
FIGS. 6a, 6b show, for a fiber in accordance with FIGS. 1a–1b, spatial mode and polarization mode intensity distributions and an associated laser mode spectrum.
Figure 6B:
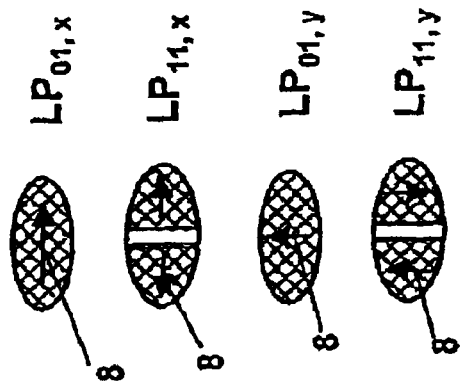

Other exemplary embodiments relate to the compensation of temperature effects. The difference between effective refractive indices of the orthogonal polarization modes X, Y or the spatial modes $LP_{01}$, $LP_{11}^{even}$, etc. is usually temperature-dependent. The beat frequencies $\Delta v$ are therefore shifted not only as a function of the pressure p, but also as a function of the temperature T. Three possibilties are specified below in order to obtain a pressure signal p independent of the temperature T:

a) The temperature is determined by measuring the laser wavelength $\lambda$. The optical grating period $n*\Lambda$ of the Bragg grating 3 for the respective refractive index n and, consequently, the emitted laser wavelengths λ are temperature-dependent. The wavelengths λ are shifted by approximately 10 pm/° C. in the wavelength region around 1550 nm. Within the detection system, part of the emitted light 6 or 7 is branched off for a wavelength detection or temperature determination, preferably with the aid of a fiber-optic coupler 15. The wavelength λ can be measured e.g. with the aid of a tunable, fiber-optic Fabry-Perot filter or a wavelength multiplexer 15. The wavelength multiplexer 15 exploits the fact that the ratio of the light intensities at the two outputs of the multiplexer 15 is wavelength-dependent. With the temperature T then known, the pressure signal p can be temperature-compensated.

b) The temperature T and the pressure p are determined from a plurality of beat frequencies Δν. If a laser 2 is operated with two spatial modes on both orthogonal polarizations x, y (FIGS. 6a, 6b), a total of six beat frequencies occur, of which e.g. four $\Delta\nu_1$, $\Delta\nu_b$, $\Delta\nu_c$, $\Delta\nu_d$ can be measured, which correspond to the effective mode refractive index differences $n_{LP01,x}-n_{LP11,x}$, $n_{LP01,y}-n_{LP11,y}$, $n_{LP01,x}-n_{LP01,y}$-and $n_{LP11,x} n_{LP11,y}$. The refractive index differences usually have different temperature dependencies. In particular, the temperature dependencies of the refractive index differences of the spatial modes $LP_{01}$, $LP_{11}$, ($n_{LP01,x}-n_{LP11,x}$; $n_{LP01,y}-n_{LP11,y}$) differ from those of the orthogonal polarization modes X, Y with identical spatial mode structure ($n_{LP01,x}-n_{LP01,y}$;$n_{LP11,x}-n_{LP11,y}$). A system of four equations can be established for the shift in the beat frequencies $\Delta\nu_a$, $\Delta\nu_b$, $\Delta\nu_c$, $\Delta\nu_d$ in the case of pressure and temperature changes δp and δT:

$$\delta(\Delta\nu_a) = a_{11}*\delta p + a_{12}*\delta T$$

$$\delta(\Delta\nu_b) = a_{21}*\delta p + a_{22}*\delta T$$

$$\delta(\Delta\nu_c) = a_{31}*\delta p + a_{32}*\delta T$$

$$\delta(\Delta\nu_d) = a_{41}*\delta p + a_{42}*\delta T \qquad (14)$$

The coefficients $a_{ij}$ where indices i=1, 2, 3, 4 and j=1, 2 can be determined experimentally. Pressure and temperature changes can then be determined independently of one another.

c) Sensors which operate with two spatial modes ($LP_{01}$ and $LP_{11}^{even}$) can also be inherently temperature-compensated. In this case, there is a wavelength 1 at which the group velocities of the two spatial modes are identical. For said wavelength λ, the refractive indices $n_{LP01}$ and $n_{LP11}$ have the same temperature dependence. If the fiber parameters a, b, ΔN and grating parameters Λ, n are coordinated with one another such that the laser emission 6, 7 takes place at said wavelength λ, the difference $1_{LP01}-1_{LP11}$ or the resulting beat frequency Δν is independent of the temperature T.

Figure 7:
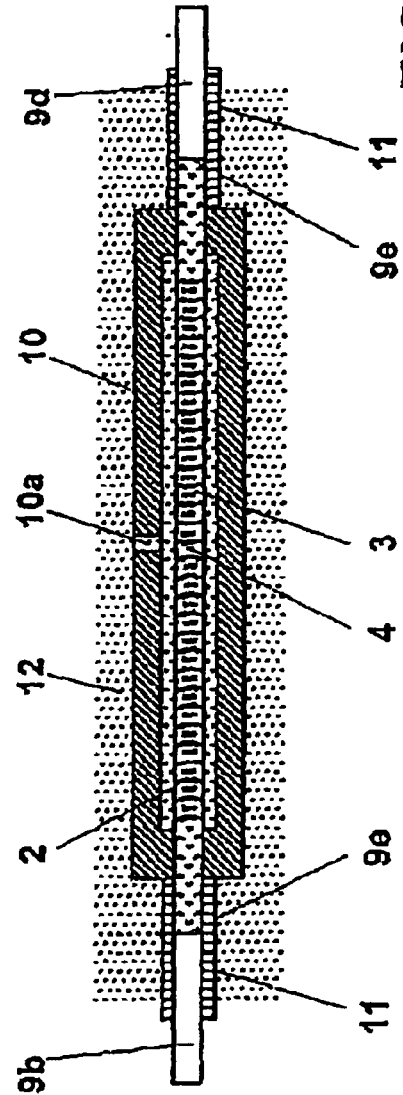
FIG. 7 shows a housing for a DFB fiber laser pressure sensor.

FIG. 7 shows the sensor housing or the capillary 10 for the DFB fiber laser 2 with a pressure inlet 10a for a measurement fluid 12 that transmits pressure or comprises chemical substances. The fiber 2 is mechanically protected on the outside on the housing 10 by means of a fiber cable 11. For pressure measurement, the laser and sensor fiber 2 is preferably provided with a protective sheath (e.g. a thin chromium/gold coating) which prevents the ingress of fluid molecules 12 into the fiber 2 at high pressures p and temperatures T. For the purpose of measuring chemical substances, specific coatings may be present for the optionally selective addition of analytes. For the purpose of measuring acoustic or seismic pressures or waves, a coating with polyurethane or the like may be present for impedance matching to the sound-transmitting medium 12. The or each fiber Bragg grating resonator 3 is advantageously accessible over its entire length to an isotropic pressure p, an acoustic or seismic wave or a chemical substance.

One side of the fiber laser 2 is connected via a connecting fiber 9b to the pumping laser 13 and the measurement means 15–21. The other side can be connected via a feed fiber 9d to further sensors 2 arranged in series. In the case of an elliptical core fiber 2, additional means 9b–9e for the spatially selective coupling-out and detection of at least one interference pattern component of different spatial modes $LP_{01}$, $LP_{11}^{even}$, $LP_{11}^{odd}$, $LP_{21}^{even}$ with a nonvanishing contrast in the resulting beat signal can be realized by a monomode feed fiber 9b, 9c or 9d being used to transmit emitted laser light 7 to a detection unit 16, 20 and the feed fiber 9b, 9c or 9d being optically connected to the laser-amplifying fiber 2 via a splice 9e with a lateral offset.

Figure 8:
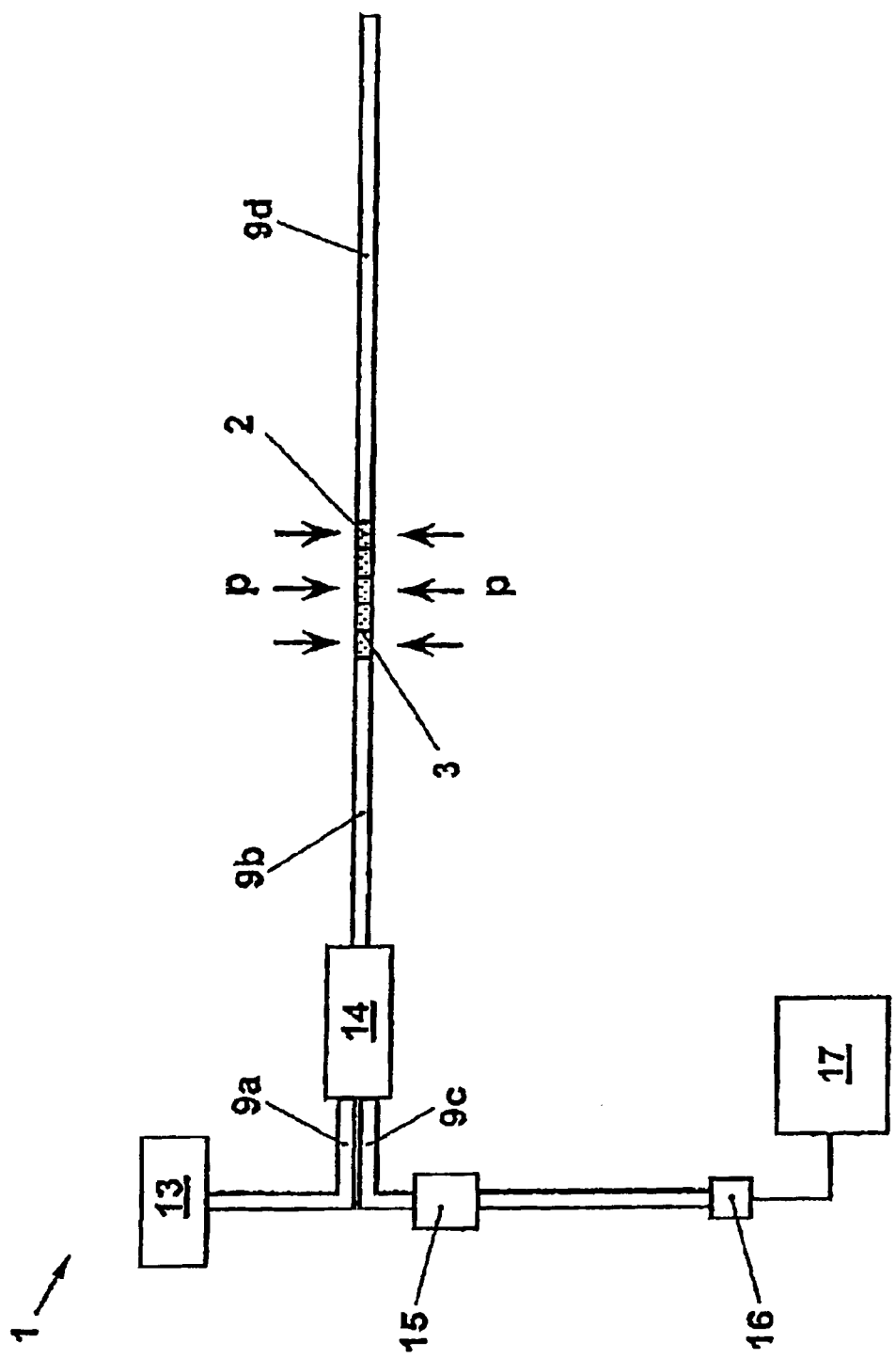
FIG. 8 shows a diagrammatic illustration of the entire fiber laser sensor.

FIG. 8 shows the overall sensor configuration 1. The fiber laser sensor 1 is excited with a 980 nm semiconductor laser 13 in the case of an erbium/ytterbium-doped fiber 2. Instead of the 980 nm pumping laser 13, it is also possible to use a 1480 nm laser 13, in particular in the case of erbium-doped fibers 2 without ytterbium. The pumping light 5 is preferably fed to the sensor 1 via a wavelength multiplexer 14 and a fiber connection 9b. In the case of the reflection geometry illustrated, the light 7 emitted backward by the fiber laser 2 passes via the same connecting fiber 9b and the wavelength multiplexer 14 to the receiver 16. The beat frequency(ies) Δν contained in the output signal is or are detected by a suitable frequency counter (if appropriate with frequency filter) or signal analyzer 17. As an alternative, it is also possible to detect the forward-emitted laser light 6 of the sensor 1 which copropagates with the pumping light 5.

In order to generate a beat from two mutually orthogonal polarization modes X, Y, the latter, before reaching the receiver 16, must be brought into interference in a polarizer with a polarization monitoring arrangement connected upstream (not illustrated). By contrast, the generation of a beat of two spatial modes $LP_{01}$, $LP_{11}$ etc. of identical polarization requires no additional means.

Figure 9:
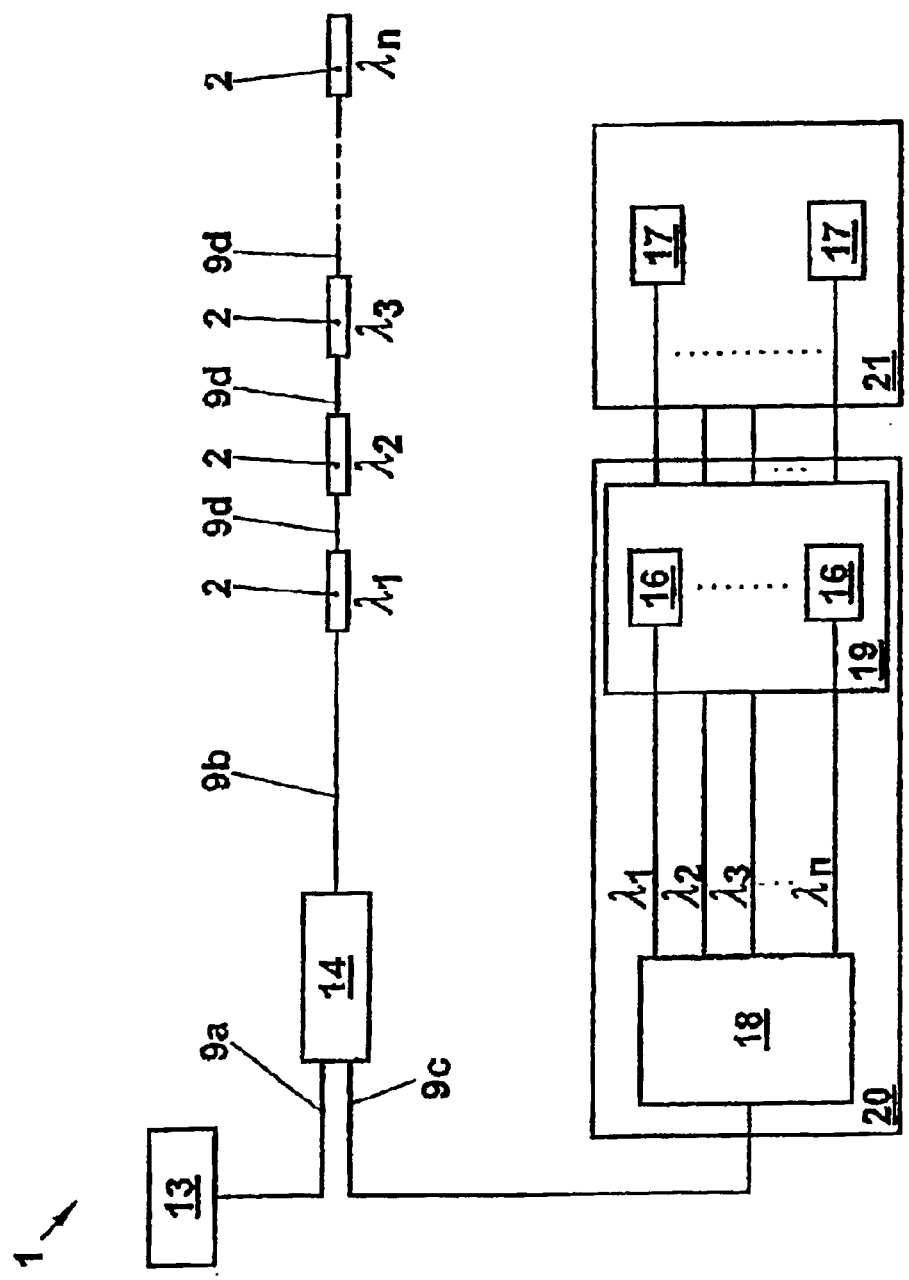
FIG. 9 shows a serial multiplex arrangement in reflection with a plurality of fiber laser sensors having different laser wavelengths.

FIG. 9 shows an example of how it is possible to operate a plurality of fiber lasers arranged in series with a single pumping laser 13 and a detection system 20, 21 (quasi-distributed pressure measurement). The grating periods $\Lambda_1, \ldots, \Lambda_n$, of the individual lasers 1 and hence in each case at least one emission wavelength $\lambda_1, \ldots, \lambda_n$ of their laser spectra are chosen to be somewhat different, so that it is possible to distinguish between the various sensors 1 using the emission wavelengths $\lambda_1, \ldots, \lambda_n$. The individual wavelengths $\lambda_1, \ldots, \lambda_n$ are separated in a wavelength multiplexer 18 and fed, in a multichannel detector 19 and a multichannel electronic evaluation unit 21, in each case to a receiver 16 with frequency counter 17 connected downstream.

The measurement quantity detected may also be, in addition to an isotropic pressure p and a chemical substance, a uniaxial lateral force or force that is effective in the fiber direction, or, by means of the Kerr effect, an electric field. In particular, it is possible to measure a temporally variable pressure p of an acoustic or seismic wave e.g. in an oil borehole.

LIST OF REFERENCE SYMBOLS

| | |
|---|---|
| 1 | Fiber laser sensor |
| 2 | Fiber laser, anisotropic sensor fiber |
| 2a | (Elliptical) fiber core |
| 2b | Fiber cladding |
| 2c | Side holes |
| 3 | Fiber Bragg grating resonator |
| 4 | π phase jump |
| 5 | Pumping light |
| 6 | Forward laser emission |
| 7 | Backward laser emission |
| 8 | Polarization vector |
| 9a–9d | Feed fibers |
| 9e | Splice with lateral offset |
| 10 | Housing, capillary |
| 10a | Pressure inlet |
| 11 | Fiber cable |
| 12 | Fluid |
| 13 | Pumping light source, pumping laser |
| 14 | Fiber coupler, wavelength multiplexer |
| 15 | Wavelength multiplexer for wavelength measurement |
| 16 | Detector, photodiode |
| 17 | Frequency counter |
| 18 | Wavelength demultiplexer |
| 19 | Multichannel detector |
| 20 | Detection unit |
| 21 | Electronic evaluation unit |
| a, b | Ellipse axes |
| $LP_{01}$, $LP_{11}^{even}$, $LP_{11}^{odd}$, $LP_{21}^{even}$ | Spatial modes |
| $n_{LP01}$, $n_{LP11}^{even}$, $n_{LP11}^{odd}$, $n_{LP21}^{even}$ | Effective spatial mode refractive indices |
| $n_x$, $n_y$ | Effective polarization mode refractive indices |
| $n_1$, $n_2$ | Effective mode refractive indices |
| $N_1$, $N_2$ | Refractive index of fiber core, fiber sheath |
| $\Delta N$ | Refractive index jump |
| p | (isotropic) pressure |
| V | Normalized frequency |
| x, y | Linear polarization axes, index for polarization of the spatial modes |
| X, Y | Polarization modes (with arbitrary spatial mode structure) |
| $\Lambda$, $\Lambda_1$, $\Lambda_2$ | Grating period |
| $\lambda_{LP01}$, $\lambda_{LP11}^{even}$, $\lambda_{LP11}^{odd}$, $\lambda_{LP21}^{even}$; $\lambda_1,..., \lambda_n$ | Wavelengths |
| $\Delta v$, $\Delta v_1$, $\Delta v_2$, $\Delta v_3$; $\Delta v_a$, $\Delta v_b$, $\Delta v_c$, $\Delta v_d$ | Beat frequencies |

What is claimed is:

1. A fiber laser sensor, in particular suitable for pressure measurement in oil boreholes, comprising a DFB fiber laser, which has a laser-amplifying fiber with a fiber Bragg grating resonator written in distributed fashion therein, a measurement quantity making it possible to induce a birefringence and beat frequency ($\Delta v_1$, $\Delta v_2$, $\Delta v_3$; $\Delta v_a$, $\Delta v_b$, $\Delta v_c$, $\Delta v_d$) between modes (X, Y, $LP_{01}$, $LP_{11}^{even}$, $LP_{11}^{odd}$, $LP_{21}^{even}$) of the laser-amplifying fiber and measurement means for determining the beat frequency ($\Delta v_1$, $\Delta v_2$, $\Delta v_3$; $\Delta v_a$, $\Delta v_b$, $\Delta v_c$, $\Delta v_d$) being present, wherein
   a) the laser-amplifying fiber has a nonrotationally symmetrical structure,
   b) an emission wavelength range and parameters (a, b, $\Delta N$) of the laser-amplifying fiber are chosen in such a way that the emission wavelength range and a wavelength range in which at least two different spatial modes ($LP_{01}$, $LP_{11}^{even}$, $LP_{11}^{odd}$, $LP_{21}^{even}$) are propagatable overlap in a spectral region, and
   c) at least one grating period $\Lambda$ of the fiber Bragg grating resonator is chosen in such a way that Bragg wavelengths ($\lambda_{LP01}$, $\lambda LP_{11}^{even}$, $\lambda_{LP11}^{odd}$, $\lambda LP_{21}^{even}$) assigned to the different spatial modes ($LP_{01}$, $LP_{11}^{even}$, $LP_{11}^{odd}$, $LP_{21}^{even}$) lie in the spectral region.

2. The fiber laser sensor as claimed in claim 1, wherein
   a) the laser-amplifying fiber has an elliptical core, and an emission wavelength range and parameters (a, b, $\Delta N$) of the laser-amplifying fiber and also a grating period $\Lambda$ of the fiber Bragg grating resonator are coordinated with one another in such a way that at least two, in particular exactly two or four, different spatial modes ($LP_{01}$, $LP_{11}^{even}$, $LP_{11}^{odd}$, $LP_{21}^{even}$) are propagatable in the emission wavelength range at Bragg wavelengths ($\lambda_{LP01}$, $\lambda_{LP11}^{even}$, $\lambda_{LP11}^{odd}$, $\lambda LP_{21}^{even}$) of the fiber Bragg grating resonator,
   b) in particular in that additional means are present which are configured for the spatially selective coupling-out and detection of at least one interference pattern component of different spatial modes ($LP_{01}$, $LP_{11}^{even}$, $LP_{11}^{odd}$, $LP_{21}^{even}$) with a nonvanishing contrast in the resulting beat signal, and
   c) in particular in that the additional means are a monomode feed fiber for transmitting emitted laser light to a detection unit, which is optically connected to the laser-amplifying fiber via a splice with lateral offset.

3. The fiber laser sensor as claimed in claim 2, wherein
   a) a first beat frequency ($\Delta v_1$) can be measured between a fundamental spatial mode ($LP_{01.x}$, $LP_{01.y}$) and a first higher even spatial mode ($LP_{11.x}$, $LP_{11.y}^{even}$) and/or
   b) a third beat frequency ($\Delta v_3$) can be measured between identical spatial modes ($LP_{01}$, $LP_{11}^{even}$, $LP_{11}^{odd}$, $LP_{21}^{even}$), in particular the fundamental spatial modes ($LP_{01}$), with orthogonal linear polarization (x, y).

4. The fiber laser sensor as claimed in claim 2, wherein
   a) a second beat frequency ($\Delta v_2$) can be measured between a first higher odd spatial mode ($LP_{01.x}^{even}$, $LP_{11.y}^{odd}$) and a second higher even spatial mode ($LP_{21.x}^{even}$, $LP_{21.y}^{even}$), and
   b) in particular in that the parameters (a, b, $\Delta N$) of the laser-amplifying fiber, in particular lengths of the core-ellipse principle axes (a, b) and a core-sheath refractive index difference ($\Delta N$), are chosen in a range of values for which the second beat frequency ($\Delta v_2$) is less than 100 GHz, and preferably less than 10 GHz, and, in particular, lies in proximity to a zero crossing.

5. The fiber laser sensor as claimed in claim 2, wherein, through a choice of the parameters (a, b, $\Delta N$) of the laser-amplifying fiber and of the grating period L of the fiber Bragg grating resonator, Bragg wavelengths ($\lambda_{LP01}$, $\lambda_{LP11}^{even}$) assigned to a fundamental spatial mode ($LP_{01}$) and a first higher even spatial mode ($LP_{11}^{even}$) are chosen such that group velocities of said spatial modes ($LP_{01}$, $LP_{11}^{even}$) are of identical magnitude.

6. The fiber laser sensor as claimed in claim 1, wherein the measurement means, in particular a detection unit and an electronic evaluation unit, have means for determining a temperature of the fiber laser sensor and for correcting a temperature dependence of a signal, in particular a pressure signal, of the fiber laser sensor.

7. The fiber laser sensor as claimed in claim 6, wherein
   a) the means are configured for determining a temperature by measuring a laser wavelength ($\lambda_{LP01}$, $\lambda_{LP11}^{even}$, $\lambda_{LP11}^{odd}$, $\lambda_{LP21}^{even}$) of the fiber laser sensor, and
   b) in particular in that the means comprise a wavelength multiplexer with a suitably wavelength-dependent coupling-out ratio.

8. The fiber laser sensor as claimed in claim 6, wherein the means are configured for measuring a plurality of beat frequencies ($\Delta v_a$, $\Delta v_b$, $\Delta v_c$, $\Delta v_d$), and for separately determining a pressure change $\delta p$ and temperature change $\delta T$ with the aid of known temperature coefficients ($a_{12}, \ldots, a_{42}$) and pressure coefficients ($a_{11}, \ldots, a_{41}$) of the beat frequencies ($\Delta v_a, \Delta v_b, \Delta v_c, \Delta v_d$) of the fiber laser sensor.

9. The fiber laser sensor as claimed in claim 1, wherein
   a) the or each fiber Bragg grating resonator is accessible over its entire length to the measurement quantity, in particular an isotropic pressure p or a chemical substance and/or
   b) a grating structure of the fiber Bragg grating resonator has a phase jump of $\pi+m*2*\pi$ preferably in a center of the fiber Bragg grating, or a grating structure of the fiber Bragg grating resonator has two fiber Bragg gratings with a phase shift of $\pi+m*2*\pi$ distributed over their: length, where m denotes an integer.

10. The fiber laser sensor as claimed in claim 1, wherein the laser-amplifying fiber has an elliptical core, a "bow-tie" structure, a "panda" structure, a "side-hole" structure, a "D-shape" structure, an elliptical fiber cladding or a partially ground fiber cladding, or is a microstructured fiber with a nonrotationally symmetrical structure.

11. The fiber laser sensor as claimed in claim 1, wherein
   a) two fiber Bragg grating resonators are written into the laser-amplifying fiber one above the other, in overlapping fashion or in spatially separate fashion, and
   b) a ratio $\Lambda_2/\Lambda_1$ of grating periods $\Lambda_1, \Lambda_2$ of the fiber Bragg grating resonators is chosen to be approximately equal to a ratio $n_1/n_2$ of effective refractive indices of two different spatial modes ($LP_{01}$, $LP_{11}^{even}$, $LP_{11}^{odd}$, $LP_{21}^{even}$), preferably of a fundamental and first higher even spatial mode ($LP_{01}$, $LP_{11}^{even}$), or of two identical spatial modes with orthogonal linear polarization (X, Y).

12. The fiber laser sensor as claimed in claim 1 wherein
   a) the measurement quantity is a temporally varying pressure p, in particular an acoustic wave or a seismic wave, and
   b) in particular in that the laser-amplifying fiber has a coating, for example made of polyurethane, for acoustic impedance matching.

13. A fiber laser sensor, in particular suitable for pressure measurement in oil boreholes, comprising a DFB fiber laser, which has a laser-amplifying fiber with a fiber Bragg grating resonator written in distributed fashion therein, a measurement quantity making it possible to induce a birefringence and beat frequency ($\Delta v_1, \Delta v_2, \Delta v_3; \Delta v_a, \Delta v_b, \Delta v_c, \Delta v_d$) between modes (X, Y, $LP_{01}$, $LP_{11}^{even}$, $LP_{11}^{odd}$, $LP_{21}^{even}$) of the laser-amplifying fiber, and measurement means for determining the beat frequency ($\Delta v_1, \Delta v_2, \Delta v_3; \Delta v_a, \Delta v_b, \Delta v_c, \Delta v_d$) being present, wherein
   a) the measurement quantity is an isotropic pressure p acting radially on the laser-amplifying fiber or a chemical substance which can be added radially to the laser-amplifying fiber, and
   b) the laser-amplifying fiber has a nonrotationally symmetrical structure in such a way that the isotropic pressure p or the chemical substance make it possible to induce the birefringence and beat frequency ($\Delta v_1, \Delta v_2, \Delta v_3; \Delta v_a, \Delta v_b, \Delta v_c, \Delta v_d$) between one pair or a plurality of pairs of modes (X, Y, $LP_{01}$, $LP_{11}^{even}$, $LP_{11}^{odd}$, $LP_{21}^{even}$) of the laser-amplifying fiber.

14. The fiber laser sensor as claimed in claim 13, wherein the modes are identical or different spatial modes with mutually orthogonal linear polarization (X, Y) or different spatial modes ($LP_{01}$, $LP_{11}^{even}$, $LP_{11}^{odd}$, $LP_{21}^{even}$) with identical linear polarization.

* * * * *